(12) United States Patent
Pisutha-Arnond et al.

(10) Patent No.: US 7,509,148 B1
(45) Date of Patent: Mar. 24, 2009

(54) MESSAGE ALERT SYSTEM AND METHOD OF PROVIDING MESSAGE NOTIFICATION

(75) Inventors: Suthirug Num Pisutha-Arnond, Vernon Hills, IL (US); Sheila Renee Crosby, Libertyville, IL (US); Eric Christensen, Buffalo Grove, IL (US); Paul Silver, Buffalo Grove, IL (US); George W. Schaupp, Jr., Barrington, IL (US); Keith McConnell, Wonder Lake, IL (US); Scott E. Preece, Urbana, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/504,135

(22) Filed: Feb. 15, 2000

(51) Int. Cl.
*H04B 1/38* (2006.01)
(52) U.S. Cl. ...................... 455/567; 455/466
(58) Field of Classification Search ............. 455/412.1, 455/412.2–413, 566, 567, 414.2, 466; 340/7.52, 340/7.55, 7.61
See application file for complete search history.

(56) References Cited

U.S. PATENT DOCUMENTS

| | | | | |
|---|---|---|---|---|
| 4,626,842 A * | 12/1986 | Ichikawa et al. | ........... | 340/7.52 |
| 4,701,759 A * | 10/1987 | Nadir et al. | ................ | 340/7.62 |
| 4,837,798 A * | 6/1989 | Cohen et al. | ............ | 379/88.14 |
| 4,868,560 A * | 9/1989 | Oliwa et al. | ................ | 340/7.22 |
| 5,278,546 A * | 1/1994 | Weitzen et al. | ............. | 340/7.52 |
| 5,488,359 A * | 1/1996 | Faris et al. | ................. | 340/7.52 |
| 5,797,098 A * | 8/1998 | Schroeder et al. | .......... | 455/464 |
| 5,802,466 A * | 9/1998 | Gallant et al. | .............. | 455/413 |
| 6,161,007 A * | 12/2000 | McCutcheon et al. | ..... | 455/412.2 |
| 6,169,911 B1 * | 1/2001 | Wagner et al. | .............. | 455/566 |
| 6,301,245 B1 * | 10/2001 | Luzeski et al. | .............. | 370/352 |
| 6,323,783 B1 * | 11/2001 | Lizzi et al. | .................... | 340/5.1 |
| 6,333,973 B1 * | 12/2001 | Smith et al. | ............. | 379/88.12 |
| 6,411,685 B1 * | 6/2002 | O'Neal | .................... | 379/88.14 |
| 6,420,960 B1 * | 7/2002 | Dorenbosch et al. | ....... | 340/7.52 |
| 6,429,722 B1 * | 8/2002 | Amick et al. | ............... | 327/379 |
| 6,429,772 B1 * | 8/2002 | Lizzi | ......................... | 340/7.55 |
| 6,529,500 B1 * | 3/2003 | Pandharipande | ............ | 370/352 |
| 6,628,194 B1 * | 9/2003 | Hellebust et al. | ............. | 340/7.5 |

* cited by examiner

*Primary Examiner*—Quochien B Vuong
(74) *Attorney, Agent, or Firm*—Lawrence J. Chapa; Paul J. Bartusiak (57) ABSTRACT

A message alert system is useful for a communication device (10) having a display (12) and a processor (30). The message alert system includes a computer-readable medium (32) and a routine stored in the computer-readable medium (32) and configured for execution by the processor (30). The routine includes a first routine that receives a message having a message type, and a second routine that generates a display item (40) for the display (12) of the communication device (10) in accordance with the message type such that the display item (40) comprises information indicative of the message type of the received message and whether further messages of the message type have been received by the communication device (10). The routine may further includes a memory check routine that determines whether storing the message in the computer-readable medium (32) would result in exceeding a predetermined amount of the capacity of the computer-readable medium (32). The routine may still further include a routine that analyzes the message to determine a size thereof. In such an embodiment, the second routine generates the display item in accordance with the size of the message.

12 Claims, 5 Drawing Sheets

MESSAGE ALERT SYSTEM AND METHOD OF PROVIDING MESSAGE NOTIFICATION

FIELD OF THE INVENTION

The present invention relates generally to communication devices capable of receiving and displaying messages and, more particularly, to a message alert system and method of providing message notification.

BACKGROUND OF THE INVENTION

Communication devices, such as pagers, cellular telephones and the like, commonly receive not only voice messages via, for example, a voice mail system, but also textual messages. Recent advances in the display technologies have provided the capability to receive and display larger amounts of textual data. For example, cellular telephones now typically include a database for storing address book entries that may be accessed and displayed by the user. Despite the increasing reliance on such displays, the desire to provide an easily portable communication device has typically limited the size of the display to rather small dimensions.

Depending on the communication device, the user may be notified of receipt of a message via an audible, tactile, or visual alert. Visual alerts have typically included the generation of an icon on the display, the icon being indicative of a received message. To access the message, a user must usually then access a main menu providing a series of options, one of which will eventually lead to the message. As the number of features provided by the communication device grows, the user may often have to navigate through several decision screens before finally reaching a detailed description of the message.

Thus, there remains a need for a message alert system and a method of notifying a user of messages which simplifies the procedure for a user to access messages.

DETAILED DESCRIPTION OF THE PREFERRED EMBODIMENTS

In accordance with preferred embodiments of the present invention, a message alert system is provided suitable for use with a communication device. The communication device includes a display and processor, and the processor utilizes a routine stored on a computer readable medium for receiving messages, evaluating a message type and generating a display on the display that is indicative of the message type. A method of providing message notifications in accordance with the preferred embodiments of the invention is also provided.

Figure 1:
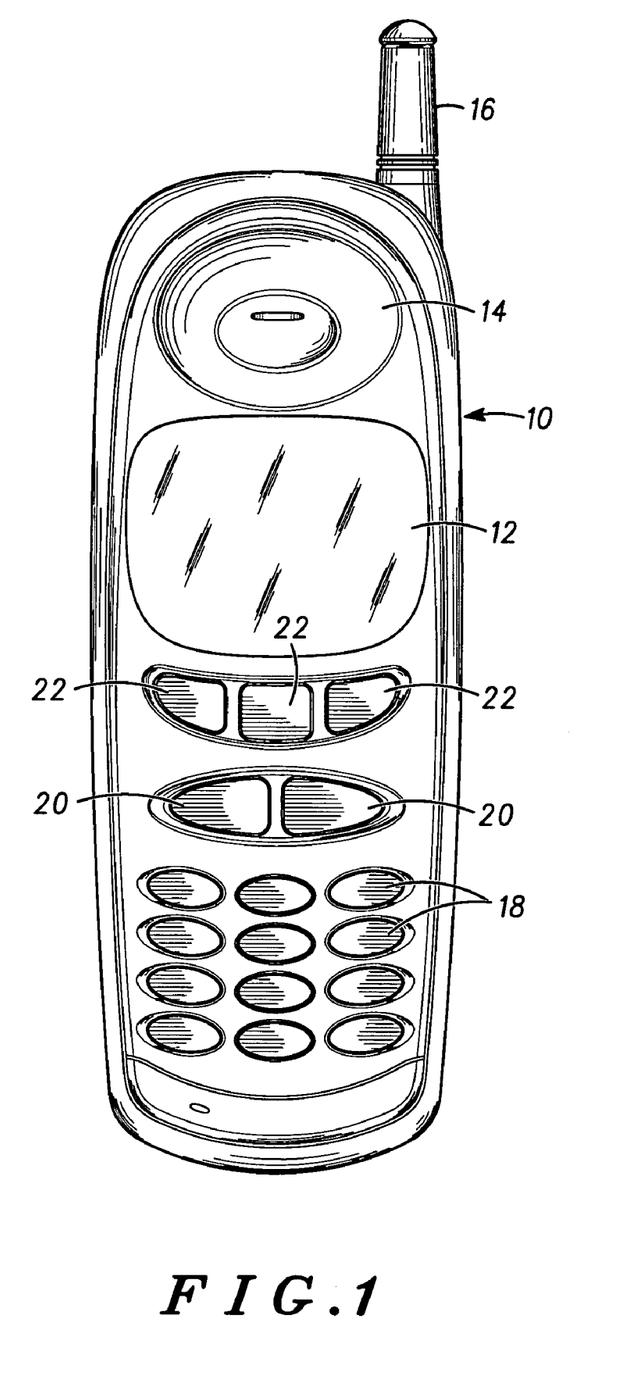
FIG. 1 is a schematic representation of a communication device capable of incorporating a message alert system in accordance with the present invention.

With reference to FIG. 1, a communication device 10, such as a mobile telephone, pager, and the like, includes a display 12 for providing textual and other visual information to a user. Practice of the present invention generally provides the communication device 10 with a user interface (via the display 12) for a messaging system wherein the interface supplies a user with message or event notification together with customized message dialogs for efficient navigation to a detailed description of the message or event. Moreover, the user interface provides such notification and dialog functionality in a limited amount of display area to accommodate the typically small size of the display 12.

The communication device 10 may be any one of a number of devices that receives messages from a communication network, and should be understood to include any communication device having a display for the provision of visual information. Practice of the present invention is not limited to the particular type of communication device depicted in FIG. 1.

The communication device 10 further includes a speaker assembly 14 for voice communication and, in general, the reception of any audio information. Receipt of information from a network (not shown) is accomplished via an antenna 16, which is coupled to signal processing circuitry that filters, demodulates, and otherwise processes incoming signals from the network. A network, in this context, shall be understood to include any communication medium having at least one other device for communication with the communication device 10. In connection with the exemplary device shown in FIG. 1, communication with the network is generally managed through use of a plurality of input buttons 18 and control buttons 20. The control buttons 20 may have specific commands associated therewith, such as a "power-on" command, a "call" command, and the like. The functionality of the input buttons 18 and control buttons 20 are not pertinent to the practice of the present invention and, moreover, the details thereof are well known to those skilled in the art.

The display 12 may constitute any one of a number of types of displays known to those skilled in the art and should not be limited to any particular display technology. However, the display 12 preferably is capable of displaying images other than alphanumeric text. For example, in one embodiment of the present invention, icons representing various types of messages are shown in a status area of the display 12. Nevertheless, practice of the present invention is not limited to displays having such functionality. The display 12 may also be touch-sensitive in that a stylus or other element touching the surface of the display 12 may initiate a task or sequence of tasks. The technology supporting such touch-sensitive displays may include well-known resistive, capacitive, or acoustic networks that provide an indication of touch location. Lastly, while some of the features of the present invention are more suited for displays of a limited size, practice of the present invention is not limited to a display of any particular size or shape.

A plurality of soft keys 22 provide further control functionality in connection with text, symbols, or other representations shown on the display 12. Each representation provided to the user on the display 12 is preferably disposed in close proximity to a respective soft key to associate a task or command with depressing the soft key. In this manner, the soft keys 22 may initiate multiple tasks and actions based on the subject matter shown on the display 12. With alternative display arrangements, the soft keys 22 may be replaced by touch sensitive areas of the display 12 or by some other mechanism that provides a flexible approach to initiating tasks.

Figure 2:
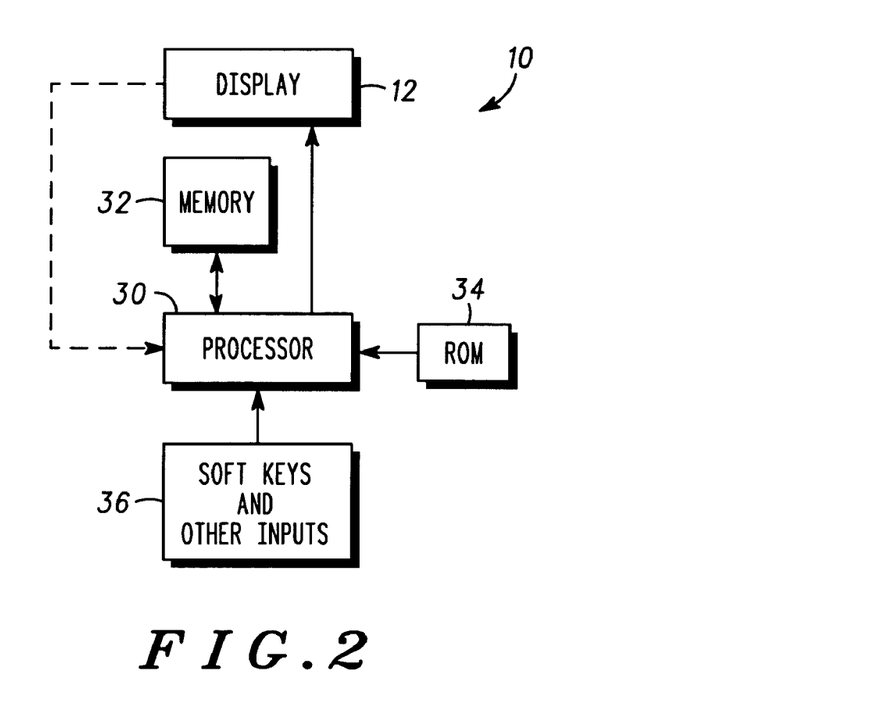
FIG. 2 is a schematic representation of components of the communication device of FIG. 1 for implementing one embodiment of the message alert system.

With reference to FIG. 2, the display 12 of the communication device 10 is driven by a processor 30 that may comprise one or more processing units or components. The processor 30 may comprise either a general-purpose processor and/or an application-specific integrated circuit for performing tasks such as maintaining and processing the information stored in one or more memories 32 for eventual depiction on the display 12. The processor 30 may further comprise other processing units dedicated to performance of specific functions. For example, an integrated or stand-alone digital signal processor (DSP) may handle the processing of incoming signals. In the embodiment shown in FIG. 2, the processor 30 is set forth schematically and for simplicity in illustration as a system-on-a-chip, but shall be understood to be representative of any processing architecture known to those skilled in the art.

The processor 30 preferably executes programming comprising one or more routines stored either in the one or more memories 32, or alternatively, in a read-only memory (ROM) 34. Either the memories 32 or the ROM 34 may comprise a separate and distinct chip that is connected via a data bus or otherwise to the processor 30. Like the processor 30, the particular architectures of the memories 32 or the ROM 34 are not pertinent to the practice of the present invention. The particular architecture or configuration of the memories 32 and ROM 34 preferably provides for the efficient execution of the programming stored therein. The memories 32 may comprise one or more ROMs (including the ROM 34), dynamic or static random-access memory (RAM), or any other type of programmable memory, such as one or more EPROMs, EEPROMs, registers, and the like. The routines stored in the memories 32 or the ROM 34 may be stored in the form of executable software, firmware, or in any other fashion known to those skilled in the art.

In addition to the programming to be executed by the processor 30, the memories 32 (or some portion or component thereof) preferably store information received from the network or generated by the user. The information from the network may include messages of an audible or visual nature, which may have been stored in an inbox portion of the memories 32. Portions of the inbox, in turn, may be devoted to messages that have not yet been reviewed by the user, that have been reviewed by the user but not yet deleted, or those messages that fall within any other desired category. The memories 32, whether considered collectively, individually, or by portion (e.g., the inbox) thereof, have a certain memory capacity established by the amount of information that may be stored therein. The manner in which the information is stored, however, is well known to those skilled in the art and not pertinent to the practice of the present invention.

A variety of input mechanisms 36 provide user-initiated commands or user-generated data to the processor 30 for actuation or processing, as appropriate. The input mechanisms 36 may include the buttons 18 and 20 (FIG. 1), as well as the soft keys 22. The input mechanisms 36 may further include data originating from the display 12, if, for instance, the surface of the display 12 is touch-sensitive.

In accordance with one embodiment of the present invention, a user of the communication device 10 is notified of a message that has been (or will be) transmitted via the network to the communication device 10 by a message alert system. The inventive message alert system is preferably stored as a software routine in the one or more memories 32 or the ROM 34, but alternatively may be stored in any computer-readable medium as any combination of hardware, firmware, or software in either a localized or distributed manner. In any event, the message alert system is implemented via programming that generally provides both a message alert to inform the user of the existence of the message, and a message dialog to enable the user to navigate in an unobtrusive manner to a detailed description of the message.

A message, as used herein, shall be understood to include any event having information associated therewith. The information of the message may originate from any source and is typically transmitted to the communication device 10 via the network. However, the message may be associated with information concerning an event, such as an appointment, that originated from data created by the user via the communication device 10 itself.

Each message has a message type that may be based on the information associated with the message, the context of the message, or any other factor. The message alert system may handle any number of message types, but may be constrained by memory limitations to a finite number, as well as to types of messages having information of a manageable size. In an exemplary embodiment, four general types of messages may be received by the communication device 10: voice mail, textual messages, answer machine messages, and information service messages.

In general, when a new message is transmitted to the communication device or a new event occurs, the message alert system receives the message and determines the message type from type-identifying data transmitted with the message. Alternatively, the message alert system analyzes the message itself to make the type determination. The message alert system then generates a display item for the display 12 to inform the user of the new message or event. The display item may take the form of a dialog that occupies either the entire display 12 or some portion thereof (in either case, hereinafter referred to as a "dialog window"). To present information in a concise manner, generation of the dialog window also involves determining whether any other new events or messages of the same message type have been received by the communication device 10. The dialog window then presents information indicative of the total number of new messages of that message type. In this regard, a new message or event may, but need not, be defined as a message that has yet to be read or otherwise processed by the user. In any event, the running count of new messages or events for each message type minimizes the number of dialog windows which have to be displayed at any one time. When multiple dialog windows need to be displayed on the display 12 because, for instance, new messages or events of more than one message type have occurred, then the message alert system places the dialog windows in a queue in the one or more memories 32 for later provision to the display 32.

As will be further described hereinbelow, a dialog window may also provide information indicative of the current state (or availability) of the one or more memories 32.

Figure 3:
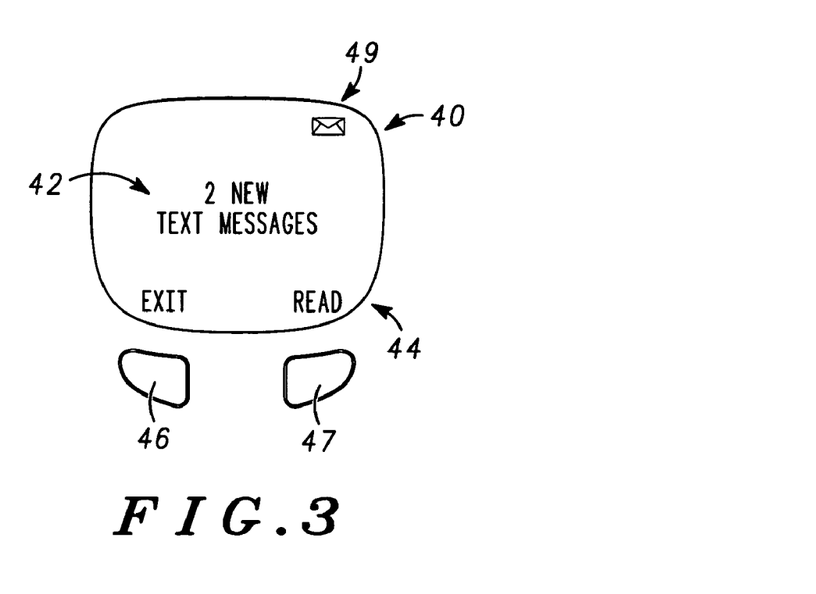
FIG. 3 illustrates an exemplary display dialog shown to a user on a display of the communication device of FIG. 1 during practice of another embodiment of the message alert system.

An exemplary dialog window 40 generated by the message alert system is illustrated in FIG. 3. The dialog window 40 presents information in a text area 42 that indicates the message type (e.g., "TEXT MESSAGES") and the number of unprocessed messages of that type. The dialog window 40 further includes a task bar area 44 preferably disposed proximate to a plurality of soft keys 46 and 47 for initiating tasks or command sequences. In this manner, the dialog window 40 provides for execution of two tasks in light of the received message(s). In this example, depressing (or otherwise executing) the soft key 46 acknowledges the message or event, but implies that the user will process the message later. In this case, initiating the "EXIT" task dismisses the dialog window. Of course, it shall be understood that other command words may utilized in this regard, such as "IGNORE", "READ LATER" and the like. The other task associated with the soft key 47 also acknowledges the event, but leads to the provision of further information and/or additional processing and handling (by the user) of the message or event. In a text message example, a detailed description of the message or event may be provided in the dialog window 40. Command words for other types of messages may include "CALL", "ANSWER" and other suitable descriptions of undertaking the processing of voice mail or answering machine messages.

The dialog window 40 also includes a status area 49 in which icons may be displayed. The icons are preferably indicative of whether any unprocessed messages or events are stored in the inbox or, more generally, the one or more memories 32. The icon is also preferably indicative of the message type of those unprocessed messages. In the example of FIG. 3, an unopened envelope indicates an unread text message. Other suitable icons for other message types may be found in the status area 49 shown in FIG. 4.

Each dialog window is preferably accompanied by a new message or event alert generated by the message alert system. The message alert system may generate one of several alert types for each message type. A new event or message alert comprises either an audible or tactile alert pattern that preferably occurs only for a finite period of time (per new event or message) in the interest of minimizing power consumption. In the example of FIG. 3, initiating the "EXIT" task silences or otherwise dismisses the alert.

To establish a respective alert type for each message type, the message alert system preferably includes an alert customization routine that provides for selecting, for each message type, one of the plurality of alerts offered by the communication device 10. Establishing distinguishable alerts for each message type may permit the user to comprehend the subject matter of the new message or event before viewing the dialog window shown on the display 12. Such "blind acknowledgment" may be useful for notification of an event of which the user is currently well aware.

In accordance with one embodiment of the message alert system, the dialog window 40 closes or "times-out" after a predetermined period of time if the user fails to act thereupon. At such time, the display 12 also times-out or, in other words, is deactivated in the interest of minimizing power consumption. After a predetermined period of time has passed since the dismissal of the original dialog window 40, the message alert system implements a reminder routine that generates a reminder display item for the previously received message. In one embodiment, the reminder display item corresponds with a reproduction of the previously displayed dialog window. Those skilled in the art shall comprehend that other types of reminders may be utilized. For example, an alternative reminder display item may track the number of times that the message alert system has generated a reminder alert.

Preferably, reminders alerts are only provided to the display 12 when the communication device 10 resides in an interruptible or idle state. Alternatively, if the display 12 of the communication device 10 is currently displaying another dialog window at the time of the generation of the reminder display item, and if the display 12 is configured such that a limited number (e.g., one) of dialog windows may be displayed at any one time, then the reminder display item may override the dialog window. In general, however, reminders will be delayed until the communication device 10 is returned to an interruptible or idle state.

Certain communication devices may have a limited amount of memory and, consequently, a limited capacity to handle multiple reminders at any one time. In such cases, the message alert system may initiate only a single reminder at any time. In cases where sufficient memory capacity in the one or more memories 32 permits the message alert system to track multiple reminders, the next most recent message or event reminder becomes active once the most recent reminder is acknowledged.

The message alert system may permit the user to customize the message or event types for which the reminder routine will be initiated. To this end, the message alert system further includes a reminder initialization routine. In this routine, the user is prompted to establish whether a reminder alert shall be initiated for messages or events of a certain message type. If reminders are activated for a particular message type, the user may further specify how often the specified reminder alert shall be generated and provided to the display 12. In this manner, the user may select that reminder alerts for new messages or events of a certain type may be generated in a periodic fashion (e.g., every five minutes) for a predetermined time period.

Figure 4:
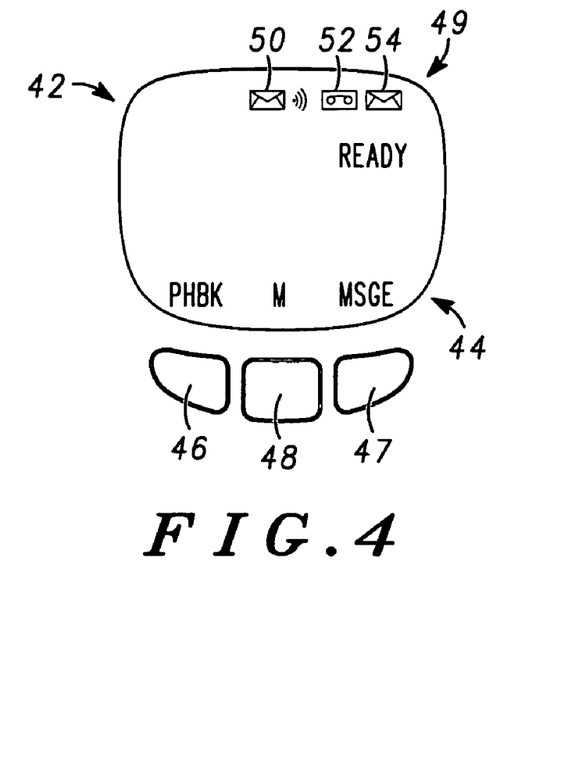
FIG. 4 illustrates a further exemplary display dialog shown to the user on the display of the communication device of FIG. 1 during practice of yet another embodiment of the message alert system.

In accordance with another embodiment of the message alert system, and with reference now to FIG. 4 (where like elements have been identified by like reference numerals), the user may also be reminded of unprocessed messages or events via the status area 49 of the display 12. Regardless of whether reminder alerts have been activated for a particular message type, the status area 49 may display icons indicative of one or more unprocessed messages or events of a particular type. Furthermore, the status area 49 may remain displayed continuously or, in other words, regardless of the operational state of the communication device 10. For the purposes of simplicity in explanation only, the display 12 shown in FIG. 4 depicts the status area 49 while the communication device 10 resides in an idle state. In the idle state, "READY" is depicted in the text area 42 to inform the user that the communication device 10 is awaiting a next command either via the soft keys 46 or 47 (and the accompanying text in the task bar area 44) or some other input mechanism. In this example, the status area 49 includes the depiction of an icon 50 indicative of a voice mail message, another icon 52 indicative of an answering machine recording, and a last icon 54 indicative of a text message. In each case, the icon 50, 52, or 54 will remain in the status area 49 until the corresponding message or event is processed by the user. Processing the message or event in this context shall be understood to include, at minimum, accessing the message to read and/or listen to at least a portion thereof.

It should be noted that the display 12 may include an icon, symbol, or text in the task bar area 44 that facilitates accessing a memo bar associated with the current operational state of the device 10. In FIG. 4, the text "M" directs the user to a soft key 48 for this purpose.

Figure 5:
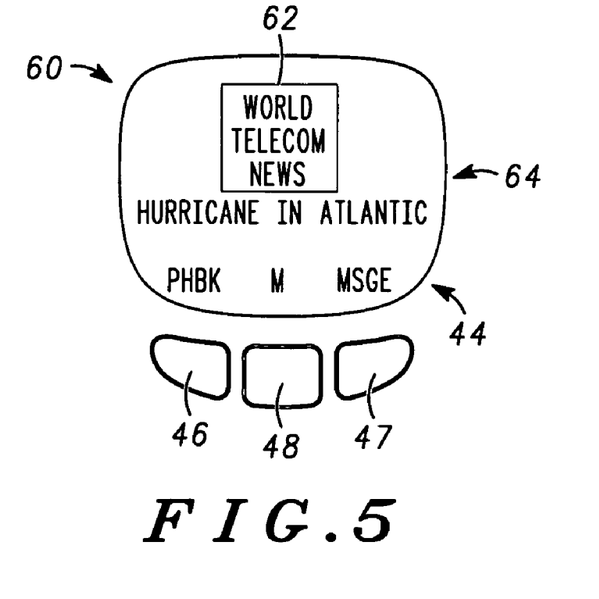
FIG. 5 illustrates a still further exemplary display screen shown to the user on the display of the communication device of FIG. 1 during an idle state of the message alert system.

With reference now to FIG. 5, the message alert system may support the receipt and display of messages associated with a cellular broadcast channel in a broadcast or similar network. While the details of such channels and networks are well known to those skilled in the art and, accordingly, will not be further discussed, the message alert system provides to the user the ability to specify that the text messages received via a certain channel be accorded a different type of display item than other text messages. More particularly, if a channel has been specified by the user as a "quickview" channel, the display item comprises at least a partial reproduction of the received message. For example, a quickview display item 60 generated by the message alert system in response to an incoming message from a channel identified in a channel designation area 62 (e.g., WORLD TELECOM) displays a first line 64 of the text of the message.

In general, the message alert system analyzes an incoming message to determine whether the message should be accorded quickview status and, if so, further analyzes the message to determine its size. The size determination may be implemented in any number of ways known to those skilled in the art. Preferably, if the size of the message is less than a predetermined size, then the quickview display item 60 comprises a reproduction of the entire message. For example, messages of only a single line (e.g., 25 characters) may be reproduced in their entirety. In the event that the size of the message exceeds the predetermined size, then the quickview display item 60 comprises a reproduction of the entire message (to the extent possible), but is only provided to the display for a predetermined length of time (e.g., 30 seconds). After the predetermined time has elapsed, the message alert system provides a second quickview dialog window to the display 12. The second quickview dialog window comprises only a portion (e.g., the first line) of the message.

A channel may be specified as a quickview channel during a channel initialization routine, in which the user can select channels known to be available or, alternatively, add new channels to a pre-existing list. Such setup routines are well known to those skilled in the art.

In a preferred embodiment, the message alert system provides the user with the option of deleting the quickview message by pressing a soft key associated with an "END", "DELETE" or other task displayed in the task bar area 44. The message alert system may further provide the user with the option of saving a copy of the quickview message in the inbox of the one or more memories 32 as a processed (i.e., read) message. Saving quickview messages may also be initiated via the task bar area 44 and associated soft keys.

Figure 6:
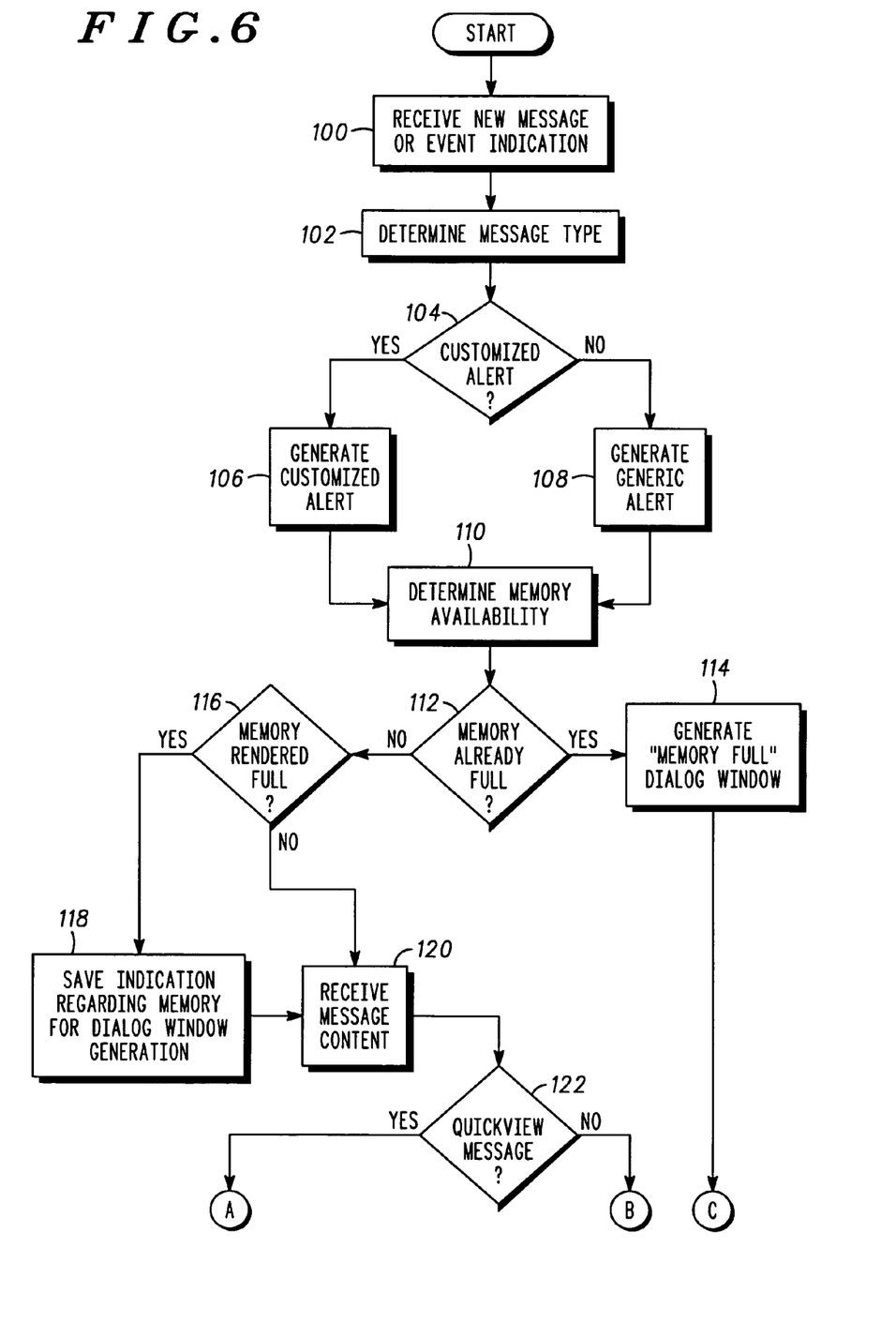
FIGS. 6 and 7, taken together, are flow diagrams illustrating program steps implemented during practice of a preferred embodiment of the present invention.
Figure 7:
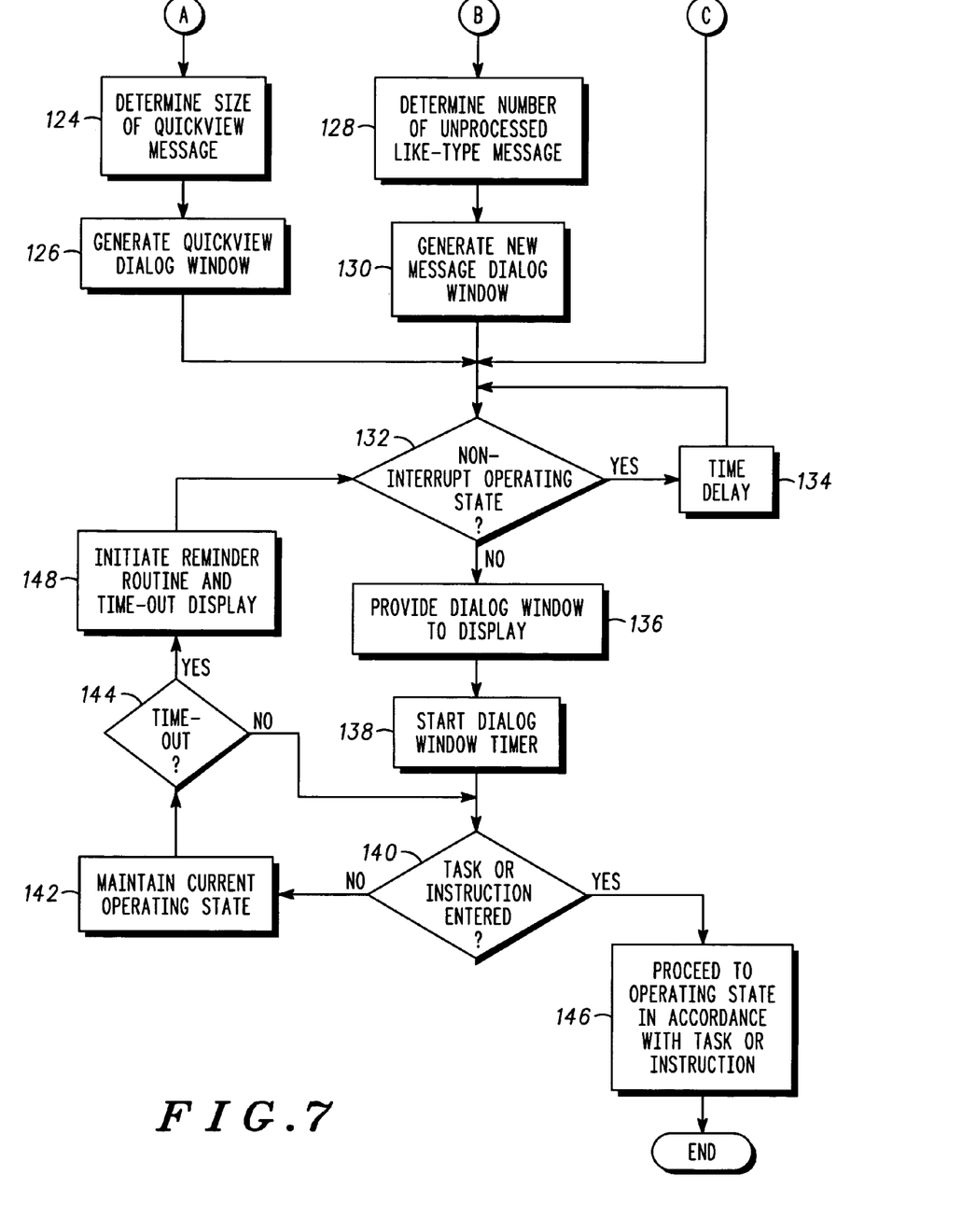

The programming that leads to implementation of the above-described message alert system routine is set forth in FIGS. 6 and 7. While the implementation is set forth in diagrammatic form as a sequence of program steps, the programming need not be realized in software. Beginning with FIG. 6, a block 100 receives an indication that an incoming message is being transmitted from the network or a new event is about to occur. The indication may comprise the information (i.e., description) associated with the message or event itself or, alternatively, data indicative of the certain parameters of the message. In either case, the data received by the communication device is analyzed in a block 102 to determine the message type of the incoming message. A block 104 then checks to see if a customized alert has been established for the particular message type. If the user has previously implemented the above-described alert customization routine during, for instance, a device setup, then a block 106 generates the particular alert selected for the particular message type. It should be noted that the customized alert, in this context, may constitute the absence of any alert. Alternatively, a block 108 generates a generic alert for the incoming message. In either case, the blocks 106 and 108 also start an alert timer that will be accessed subsequently to determine whether the alert should time-out.

Next, a block 110 determines the amount of any available memory for storing the content of the incoming message. If the memory is already past a predetermined capacity, or is considered "full" in any other fashion known to those skilled in the art, a block 112 passes control to a block 114 for generation of a "MEMORY FULL" dialog window. This type of dialog window may be generated for any message type when the network attempts to transmit a message when the one or more memories 32 no longer has available space for incoming messages. In a preferred embodiment, the generated dialog window provides the user with the option to initiate a task that displays the current inbox. In this manner, the messages in the inbox may be processed and deleted to an extent that permits the message waiting to be transmitted from the network to be transmitted to the communication device.

If the available memory space is not already full, control passes to a block 116 that determines whether the memory will be rendered "full" or, alternatively, effectively "full," in the sense that predetermined amount of the capacity of the one or more memories 32 in unavailable. If so, control passes to a block 118 that saves an indication that the inbox will become "full" or, alternatively, generates an appropriate flag for directing subsequent processing. After the block 118, or if enough memory is available to avoid passing the predetermined amount when the message is stored therein, a block 120 receives the content of the message (in the event it was not received during earlier processing) and stores the data indicative thereof in the one or more memories 32.

Control then passes to a block 122 that determines whether the incoming message should be accorded quickview status. If so, and turning to FIG. 7, a block 124 determines the size of the message and a block 126 generates a quickview display item as described hereinabove in accordance with the size. Thus, the block 126 performs the programming steps involved in generating a second quickview display item, if necessary, after a predetermined amount of time has elapsed. To this end, the block 126 incorporates a timer and other necessary programming known to those skilled in the art for implementation thereof.

If the block 122 determines that the message is not to be accorded quickview status, a block 128 determines the number of unprocessed messages in the inbox of the one or more memories 32 of the same message type as the incoming message. Control then passes to a block 130 that generates a dialog window in accordance with the message type, the number of unprocessed, like-type messages, and the results of the memory check routine.

Next, a block 132 checks the current operating state of the communication device to determine whether the dialog window generated in either the block 114, the block 126, or the block 130 should be provided to the display 12. If the user is currently viewing a detailed description of the message or is currently executing a non-interruptible task, control then passes to a block 134 that executes a time delay routine that postpones a return of control to the block 132 for another operating state determination. Once the operating state of the device enters an interruptible mode (e.g., an idle state), a block 136 provides the generated dialog window to the display 12.

The user is then provided with an opportunity to initiate a task based on the options set forth in the dialog window. Alternatively, the user may also dismiss the dialog window. In either case, a block 138 starts a dialog window timer that tracks the time that the dialog window has been displayed. The dialog window timer may, in some embodiments, correspond or otherwise cooperate with the timer utilized in connection with the alert. Next, a block 140 determines whether the user has initiated a task or, in other words, entered an instruction. If not, control passes to a block 142 that maintains the current operating state of the communication device, namely, one in which the dialog window is providing the user with an opportunity to receive or dismiss the message, or perform some other task. A block 144 then checks to see if a predetermined amount of time has elapsed to determine whether the dialog window (and the display) should time-out. If that time has yet to be reached, control passes back to the block 140 to await receipt of a user-initiated task or instruction.

Once a task or instruction is supplied by the user, a block 146 proceeds to execute the task or instruction and proceed to an operating state or mode in accordance therewith. The instruction or task may have been selected via actuation of one of the soft keys to process or dismiss the message, view the inbox contents, or via actuation of any other key, which dismisses the dialog. It should be noted that dismissing the dialog window also deactivates the alert generated by either the block 106 or the block 108 (to the extent an alert was generated for the particular message type).

If a task or instruction is not supplied within the predetermined time period, control passes to a block 148 that initiates the above-described reminder routine for eventual generation of a reminder display item after certain time period has elapsed. At that point, control may pass to the block 132 for display thereof, if appropriate.

Many additional changes and modifications could be made to the invention without departing from the fair scope and spirit thereof. The scope of some changes is discussed above. The scope of others will become apparent from the appended claims.

We claim:

1. A message alert system for a communication device wherein the communication device comprises a processor and a display for displaying information, comprising:
   a computer-readable medium; and
   a routine stored in the computer-readable medium and configured for execution by the processor, the routine comprising:
      a first routine that receives a message intended for receipt by the communication device, the message comprising the information;
      a second routine that analyzes the message to determine a size thereof, and further analyzes the message to determine from type identifying data transmitted with the message whether the message is of a message type for which a third routine is executed, wherein the criteria for the type of message is different than a criteria based on the size of the message;
   wherein the third routine generates a display item for the message in accordance with the size thereof, if the message is of the type for which the third routine is executed.

2. The message alert system of claim 1, wherein the routine further comprises an initialization routine that specifies the message type for which the third routine is executed.

3. The message alert system of claim 1, wherein the generated display item comprises a reproduction of the message when the second routine determines that the size of the message is less than a predetermined size.

4. The message alert system of claim 1, wherein:
   the generated display item comprises a reproduction of the message when the second routine determines that the size of the message is greater than a predetermined size; and
   the routine comprises a fourth routine that provides the generated display item to the display for a predetermined time.

5. The message alert system of claim 4, wherein:
   the routine comprises a fifth routine that generates a further display item that comprises a portion of the message when the second routine determines that the size of the message is greater than a predetermined size; and
   the routine comprises a sixth routine that provides the further display item to the display after the predetermined time has elapsed.

6. The software system of claim 1, wherein:
   the message is transmitted to the communication device via a network; and
   the network is a broadcast network.

7. A method in a communication device having a display for displaying information, the method comprising the steps of:
   receiving by the communication device a message intended for receipt by the communication device, the message comprising the information;
   analyzing the message to determine a size thereof, and further analyzing the message to determine from type identifying data transmitted with the message whether the message is of a message type for which the generating step is executed, wherein the criteria for determining the type of message is different than a criteria based on the size of the message; and
   generating on the display a display item for the message in accordance with the size thereof, if the message is of the type for which the generating step is executed.

8. The method of claim 7, further comprising the step of specifying the message type for which the third routine is executed.

9. The method of claim 7, wherein the generated display item comprises a reproduction of the message when the analyzing step determines that the size of the message is less than a predetermined size.

10. The method of claim 7, wherein:
    the generated display item comprises a reproduction of the message when the size of the message is greater than a predetermined size; and
    the method further comprises the step of providing the generated display item to the display for a predetermined time.

11. The method of claim 10, further comprising the steps of:
    generating a further display item that comprises a portion of the message when the size of the message is greater than a predetermined size; and
    providing the further display item to the display after the predetermined time has elapsed.

12. The software system of claim 7, wherein the message is transmitted to the communication device via a broadcast network.

* * * * *